United States Patent [19]

Tary

[11] Patent Number: 4,933,606
[45] Date of Patent: Jun. 12, 1990

[54] DISCHARGE LAMP DRIVING METHOD AND ELECTRONIC OPERATORS FOR IMPLEMENTATION OF THE SAME

[76] Inventor: Tamas Tary, 1976 Connaught Avenue, Port Coquitlam, British Columbia, Canada, V3C 4C5

[21] Appl. No.: 310,465

[22] Filed: Feb. 15, 1989

Related U.S. Application Data

[63] Continuation of Ser. No. 95,836, Sep. 14, 1987, abandoned.

[51] Int. Cl.$^5$ .................. H05B 37/02; H05B 41/36
[52] U.S. Cl. ............................ 315/244; 315/200 R; 315/225; 315/307
[58] Field of Search ...... 315/200 R, DIG. 5, DIG. 7, 315/225, 224, 244, 291, 307; 323/304, 305, 311, 312; 363/95, 98

[56] References Cited

U.S. PATENT DOCUMENTS

| | | | |
|---|---|---|---|
| 4,207,497 | 6/1980 | Capewell | 315/96 |
| 4,553,070 | 11/1985 | Sairanen et al. | 315/244 X |
| 4,554,487 | 11/1985 | Nilssen | 315/127 |
| 4,728,866 | 3/1988 | Capewell | 315/224 |
| 4,739,226 | 4/1988 | Murata | 315/127 |

*Primary Examiner*—James J. Groody
*Assistant Examiner*—Mark R. Powell

[57] ABSTRACT

The present invention relates to a method and apparatus for driving discharged lamps and which is adapted to maximize the luminous efficiency of a discharged lamp and its associated electronic driving apparatus. This is accomplished through the power sourcing characteristics of the driver, by causing the required power to dissipated while maintaining the power factor in the lamp as near unity as possible with the real components available for the implementation of the apparatus.

17 Claims, 2 Drawing Sheets

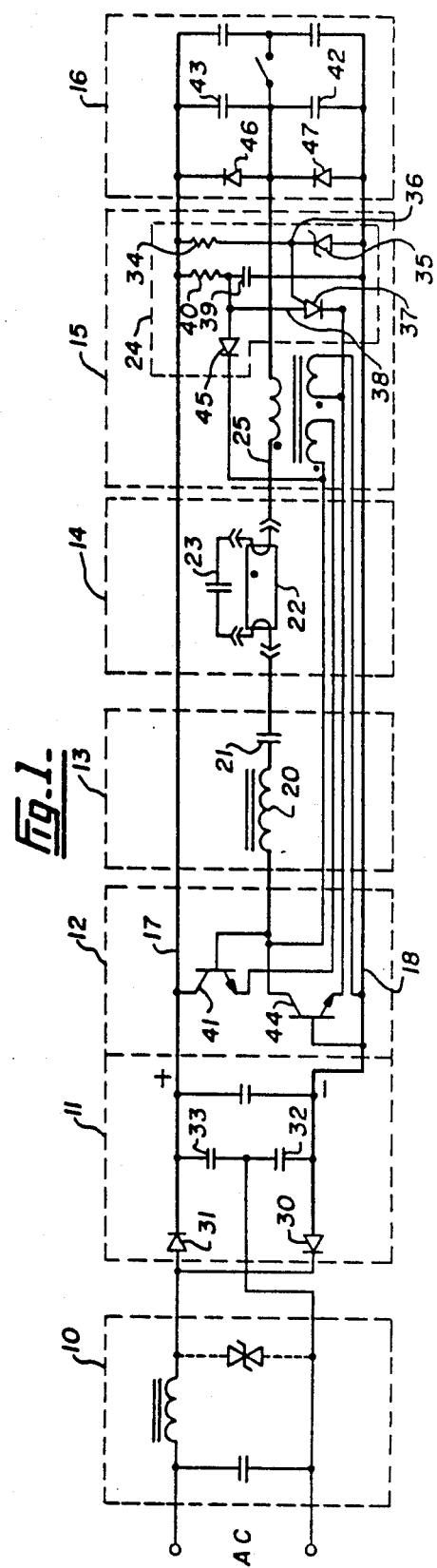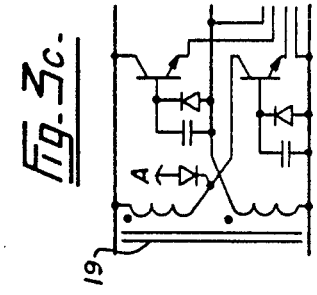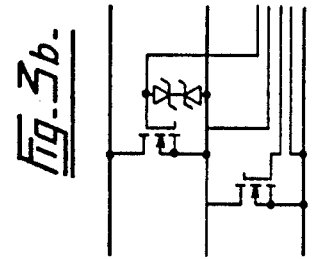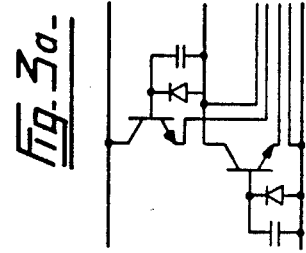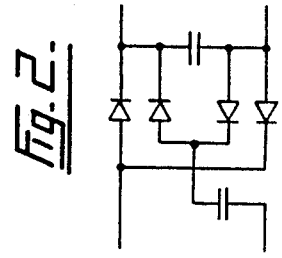

DISCHARGE LAMP DRIVING METHOD AND ELECTRONIC OPERATORS FOR IMPLEMENTATION OF THE SAME

This application is a continuation of application Ser. No. 095,836, filed Sept. 14, 1987.

FIELD OF THE INVENTION

This invention relates to a method and apparatus for driving discharge lamps. More particularly, the present invention deals with the problem associated with the driving of discharge lamps such as fluorescent, arc and neon lamps, in an efficient and effective manner throughout the complex operating cycle of these devices.

DESCRIPTION OF THE PRIOR ART

The usual method currently in use for the purpose of starting and operating fluorescent lamps involves a power source with an open circuit voltage greater than the normal operating voltage of the lamp and a means of starting the lamp or auxiliary apparatus for that purpose. In either case, the starting mode and the running mode are two distinct modes of operation with the only exception being the single lamp instant start case. However, regardless of the type of control gear currently in use they all have one characteristic in common. There is in series with the lamp a current limiting impedance that provides an additional burden for the purpose of stability and power control. Therefore, from the point of view of the power supply, the term "ballast" is appropriate for these devices. All conventional control gear referred to in this disclosure, for the purpose of simplicity, will be termed as "ballast" and "ballasts".

Various improvements to power supply and ballast devices are disclosed in U.S. Pat. No. 4,553,070 which issued to Sairanen et al, U.S. Pat. No. 4,603,378 which issued to Virta, U.S. Pat. No. 4,370,600 which issued to Zansky, U.S. Pat. No. 4,042,856 which issued to Steigerwald, U.S. Pat. No. 4,251,752 which issued to Stolz, U.S. Pat. No. 4,237,403 which issued to Davis, U.S. Pat. No. 3,629,683 which issued to Nuckolls, U.S. Pat. No. 4,320,325 which issued to Anderson, U.S. Pat. No. 4,234,822 which issued to Garrison et al, U.S. Pat. No. 4,277,728 which issued to Stevens and U.S. Pat. No. 4,127,795 which issued to Knoll.

The major factor affecting the life of fluorescent lamps when used in conjunction with conventional ballasts such as disclosed in the above referenced prior art devices, is the number of starts as compared to the time they run after each start and the ambient temperature at which the lamp is required to start. The shortening of life attributed to the number of starts is explained by the fact that during starting, the higher voltage that the lamp must withstand before effective cathode emission is established, causes some of the emission material on the cathode to be consumed. Once all the emission material is gone the cathode itself begins to deteriorate until eventually the entire cathode is gone and the lamp will fail to ignite. Another factor that contributes to lamp deterioration is the frequency of current reversal in the lamp. When the conduction cycle in one direction ceases and conduction in the other direction is initiated, if the frequency is low enough to allow the conductivity of the plasma in the tube to drop and the cathode is simultaneously allowed to cool, then before conduction can be established in the new direction, a mini restart sequence must take place entailing both a higher potential across the bulb and subsequent reestablishment of cathode emission which will again result in a small loss of emission material from the cathode.

Another problem associated with prior art driving devices, is that lighting, as it is, commonly implemented particularly where discharge lamps are used, has irritating byproducts such as the stroboscopic effect, acoustic noise and radio interference. Although efforts have been made to reduce these irritating effects, there are still complaints from the occupants of these illuminated areas concerning psychological effects of stroboscopic flicker.

Therefore, there exists a requirement for an improved driving technique and apparatus for driving discharge lamps, namely fluorescent are and neon lamps.

SUMMARY OF THE INVENTION

A first object of the present invention is to maximize the luminous efficiency of a discharge lamp and its associated electronic driving apparatus. This is accomplished through the power sourcing characteristic of the driver, by causing the required power to be dissipated while maintaining the power factor in the lamp as near unity as possible with the real components available for the implementation of the apparatus.

A second object of the present invention is to provide a driving apparatus which is simple and inexpensive to manufacture. This can be accomplished by selecting components that are restricted to mature technology, that are cheap and readily available.

A third object of the present invention is to increase the life of discharge lamps that are being driven. This accomplished by minimizing the damage to the lamp during start-up and during subsequent operation. Lamp life is extended by allowing the discharge lamps to be started very quickly by simultaneously applying cathode heat and increasing potential across the lamp. The potential across the lamp is not limited by the source of potential of the power supply so the driver is capable of providing within its design limits whatever potential is required to ignite the lamp. In practice, even temperatures below 20° C., start-ups virtually instaneous and flicker free have been demonstrated. In the low temperature test and at ordinary temperatures, no evidence of tube damage such as blackening of cathode areas has been observed. In addition, the life of discharged lamps can be extended by operating the driver at a much higher frequency than the ordinary control gear. The frequency is chosen to be high enough that there is insufficient time for the emission material on the cathodes to cool to the point where a mini restart would be necessary. At these frequencies, the lamp impedance appears as a pure resistance even immediately after current reversal.

The lamp life is also affected by the crest factor of the current in that it is forced to conduct.

If the current in the tube should be caused to exceed the electronic emission available at the cathode, then additional cathode material will be lost. To minimize this effect, the apparatus of the present invention causes the current in the lamp to be sinusoidal and symetrical in both directions without any DC offset. This insures that the cathode wear will be minimized and uniformed on both ends.

A fourth object of the present invention is to provide a driving apparatus which allows safe removal of a discharge lamp when damaged or burnt out. This is achieved by designing the apparatus such that the lamp is made a necessary component for sustained operation, such that if the lamp is removed or damaged, operation will cease, thus avoiding the danger of maintaining excessive voltages on lamp socket while the lamp is being replaced or waiting to be exchanged. In addition, a provision for signal level enabling and disabling of driver operation has been provided. This is useful for providing an alternative means to prevent overheating or to disable the unit for whatever other reason may be deemed necessary.

A fifth object of the present invention is to provide a driving apparatus adapted to minimize the unwanted side effects created when operating discharge lamps. This has been achieved by providing a driver operated from a DC source thereby creating a driver which is virtually flicker free. Any stroboscopic effect that may be present is at a frequency 30 to 100 times higher than presently common. Further, at these frequencies, even if the effect were humanly perceivable, it would be considerably attenuated by the persistence of even inexpensive phosphors. Acoustic noise, is at a frequency twice the operating frequency of the driver well beyond the ability of people's hearing. Furthermore, frequencies of 50,000 to 100,000 cycles per second (which would commonly be the case with the driver) air and construction materials form a very poor medium for efficient transmission, and form an effective means to attenuate what little imperceivable acoustic noise may escape.

Accordingly, to a first aspect of the present invention, is to provide an apparatus for driving a discharge lamp having a pair of cathodes and a pair of anodes comprising resonant circuit means connected in series with said discharge lamp, switching means connected between a negative and positive voltage source adapted to alternately connect said resonant circuit means thereto, reactive circuit means connected across said discharge lamp adapted to produce a high voltage across said lamp, synchronising circuit means for driving said switching means, said synchronizing circuit means being connected to said switching means and said discharge lamp, and control circuit means for controlling the amount of energy drawn from said voltage source.

According to a second aspect of the present invention, there is provided a method of driving a load to dissipate a predetermined amount of power, using a power sourcing apparatus having resonant circuit means incorporating said load, switching means connected between a negative and positive voltage source adapted to alternately connect said resonant circuit means thereto, synchronizing means for driving said switching means, said synchronizing means being connected to said switching means and said resonant circuit means, and control means for controlling the amount of energy drawn from said voltage source, comprising the steps of:

detecting a zero current state at said switching means by means of said synchronizing means;

actuating said switching means to drive said resonant circuit means between said negative and positive voltage source when said zero current state is detected;

actuating said control means when said resonant circuit means is connected to said positive voltage source to allow a predetermined amount of charge to be absorbed from said negative voltage source;

actuating said control means when said resonant circuit means is connected to said negative voltage source to allow a predetermined amount of charge to be absorbed from said positive voltage source; and allowing said charge to be transferred to said resonant circuit means thereby permitting said load to dissipate a predetermined amount of power.

DESCRIPTION OF THE DRAWINGS

Particular embodiments of the invention will be understood in conjunction with the accompanying drawings in which:

FIG. 1 is a schematic diagram of the discharge lamp driving apparatus of the present invention;

FIG. 2 is a schematic diagram of an AD to DC convertor according to a second aspect of the present invention;

FIGS. 3a, 3b and 3c are block diagrams of switching circuits according to third, fourth and fifth embodiments of the present invention;

DESCRIPTION OF THE PREFERRED EMBODIMENTS

Figure 4A:
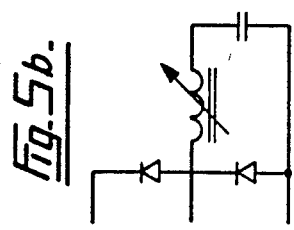
FIGS. 4a and 4b are schematic diagrams of various lamps according to a sixth and seventh embodiments of the present invention.
Figure 4B:
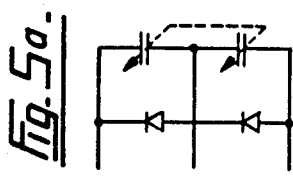

The driving method and apparatus that are the subject of this disclosure do not limit the power delivered to the lamp, as is the case with the ballast but rather cause the lamp to dissipate the required power. Therefore, a more appropriate term to describe the operation is "driving" the lamp. For the purpose of simplicity, the discharge lamp driving apparatus will be referred in this disclosure as the "lamp driver" or simply the "driver". The techniques used to cause the lamp to dissipate the required power will be referred to as "drive requirements".

Normally, power supplies have been of the two basic categories, "current sourced" or "voltage sourced" with additional features such as "voltage limited" or "current limited" respectively. In both cases the power supplied to the load has been determined by the impedance of the load. A simple illustration of the resistive case can illustrate the point. If a current sourced power supply is applied to a resistor, then the power drawn from the supply will be determined by the expression $W = i^2 R$ or in the case of the voltage sourced power supply the expression for the power drawing is $W = V^2/R$. In both cases the power drawn is determined by the load and not the power supply. Many electrical loads encountered in the real world do not have a stable impedance, but have an impedance that is heavily dependent on the voltage or current applied. The discharge lamp is one illustration of this type of load. Initially the discharge lamp appears as an open circuit and until the voltage applied across it is high enough, it does not conduct. Once conduction is initiated and current begins to flow, the impedance of the device begins to drop, exhibiting a negative impedance characteristic. In order for a discharge lamp to provide the intended light output it must dissipate a required amount of power. But the control gear that is normally in use with this type of load is of the current source type, therefore the actual power consumed depends more on the lamp then on the control gear's ability to supply the power. The actual power consumed by the lamp will then depend on: the manufacturing tolerances, the ambient conditions, and on the drift in bulb parameters as a consequence of aging.

If on the other hand, control gear were used where the power supplied to the lamp were independent of the above-mentioned variables in the lamp, then the lamp would be forced (or driven) to dissipate the required power and consequently provide the intended light output.

Referring now to FIG. 1, we have shown a schematic diagram of a discharge lamp driving apparatus according to a first aspect of the present invention. The driving apparatus is basically comprised of an EMI filtering circuit 10 and AC to DC convertor 11, a switching circuit 12, a resonant circuit 13, a load 14, a synchronising circuit 15 and an energy control circuit 16.

The EMI filter circuit 10 is necessary in virtually all high frequency equipment to prevent high frequency interference from being conducted back into the utility supply lines or the local supply which may be shared by sensitive equipment. The driver apparatus by its nature produces low energy emissions for a given amount of power then conversion topologies commonly in use. Therefore, the requirements of this circuit are less stringent than otherwise might be the case. However, both AC and DC power sources may require that this circuit be present.

In the present case, a low pass filter looking in the direction of the line is depicted. If more filtering is required, a large variety of known filter configurations may be used as well.

Diodes 30 and 31 and capacitors 32 and 33 of AC to DC convertor circuit 11 form a rectifier and filter which is the DC supply for the driving apparatus.

The AC to DC convertor circuit 11 is only required if the driver has to be operated on an AC system. The basic driver requires DC, therefore other than producing the required DC, the other objective of this circuit is related to the practical considerations in real applications. In particular, the rms current drawn from the supply and the phase angle.

On a AC system, where only a few drivers are to be used, this is not a major consideration, and therefore, the implementation shown is well suited for that application. In applications where a large number of drivers on a single circuit are used, the AC to DC convertor circuit shown in FIG. 2 would be more desirable since the crest factor of the current required to charge the filter capacitor is controlled at a lower value, and also the characteristic of the power factor is mainly non-reactive. This is particularly desirable on distribution systems where there is a significant lagging reactive power factor present. The effect is, that during the earlier part of the cycle, the circuit configuration will be taking power from the reactive energy being forced into the power line by the inductively reactive equipment during the early part of each cycle. The net effect being that from the point of view of the utility there is a improvement in the power factor of the total load.

The switching circuit 12 is comprised of the electrical switching elements which will alternately connect the series resonant circuit 13 to the positive and negative rails 17 and 18 as dictated by the synchronizing circuit 15. The implementation may be in semi-conductor form such as by the use of bipolar or mos transistors or even mechanical switches The choice will affect the operating frequency and the design of the synchronizing circuit 15. FIGS. 3a, 3b and 3c depict some of these possibilities.

FIG. 3c shows that the switching circuit can incorporate a transformer 19 if the output voltage required is to be something different than available. The circuit shown in FIG. 3c is a vertical push-pull using cascade driven bipolar transistors. One of the advantages of using this circuit design is that it offers a low end to end capacity in transformers that are bifiliar wound since the two windings are in phase, resulting in higher efficiency at high voltage, high frequency operation and low manufacturing cost.

The resonant circuit 13 is basically comprised of a series LC circuit. This forms a major part of the frequency determining components. The inductor 20 is the main inductance in the system whereas a capacitor 21 is one of several but is the dominant one. Capacitor 21 is also responsible for the very high current power sourcing characteristic at low load impedance conditions. Further, the capacitor or some equivalent of it, is always required or else the power control circuitry 16 will not operate properly If the power sourcing characteristics is to be maintained, no DC path can be allowed through the frequency determining elements.

The load 14 is comprised of a discharge lamp 22 and a reactive element 23 to produce the very high voltage characteristic of a power source at high load impedance or open circuit conditions. The reactances may be either capacitive or inductive depending on whether the frequency of operation during near open circuit conditions need to be raised or lowered. This reactance will also effect the operating frequency of the system and is therefore the other major frequency determining element in the system. This reactance is shown in conjunction with the load because the choice of type (inductive or capacitive) and specific value depends very heavily on the type of load to be driven For example, as depicted in FIG. 4a, a discharge lamp, such as a neon lamp, used as a load, will require a parallel reactance so that power will be available to the load when the load voltage is much higher than the available voltage at the switch, both to start and if desired to operate the load. The choice may be of either type The ratio to the main resonating capacitor is application dependent. However, the choice will affect the operating frequency and therefore the final operating frequency will be the result of the two reactances chosen.

To minimize the effect the load will have on the variation in operating frequency as load impedance varies, the voltage across the main resonating capacitor should be at least 1.4 times the anticipated voltage across the load.

If a resistive load is used with an intended operating voltage higher than the available supply voltage, a parallel reactance will be required that will result in a parallel equivalent impedance which will allow the equivalence series resonant current to be higher than the intended load current The criteria being that the product of the load voltage times the load current be equal to the available source voltage at the switch times the equivalent series resonant current.

The synchronizing circuit 15 also includes a start-up circuit 24. The starting circuit may be any impulse generator which will shut off once the circuit is operating.

The start up circuit shown at 24 is for illustrative purposes only and it is not necessarily limited to that embodiment.

The synchronizing circuit accomplishes several important functions. First it is responsible for operating the switching circuit 12 as near to zero current as possible. Second, it must drive the switching circuit depending on the type, such that commutation will take place as close to the zero current condition as possible. The synchronizing circuit 15 depicts for this function a transformer 25. The design of the transformer in this case must take into account the delay time of the switching element 17 and 18 used such that switching coincidence occurs at zero current. In addition, the synchronizing element must also provide the necessary drive power to the switches. The requirement for driving MOS up is quite different than cascade driving bipolar transistors. The design of the circuit will depend on the switching elements chosen.

The energy control circuit 16 controls the amount of energy that is drawn from the power supply during each half cycle of the discharge lamp. This function is accomplished by metering a certain desired charge into a reactive component and when the desired charge level is reached, recirculation of power is initiated to prevent current from flowing from the power supply, thus preventing any further energy drop. Provided that no DC path exists through the frequency determining components and the major frequency determining capacitor as a voltage across it at least 1.4 times the load voltage, then the energy control mechanism will have virtually negligible effect on the operating frequency.

In the embodiment shown in FIG. 1, it can be seen that if the capacitor is very large, the operating frequency would be dominated by the series reactive load circuits 13 and 14. On the other hand, if the capacitors were eliminated then the voltage at the load forced between the two diodes would be virtually in phase with the AC voltage emanating from the switching circuit 12. The net result being that the effective voltage across the series resonant circuits 13 and 14 would be of very low value, but the frequency would nonetheless be the same. The effect of varying value of the capacitors in circuit 16 is to vary the voltage driving the series resonant string, and thus control the power without significantly affecting the operating frequency.

Figure 5A:
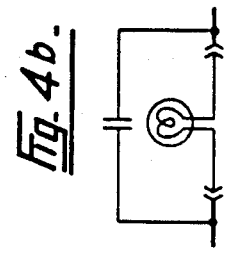
FIGS. 5a and 5b are schematic diagrams of control circuits according to a tenth and eleventh embodiment of the present invention.
Figure 5B:
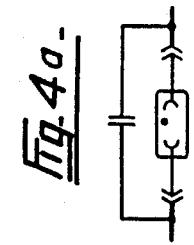
Figure 6:
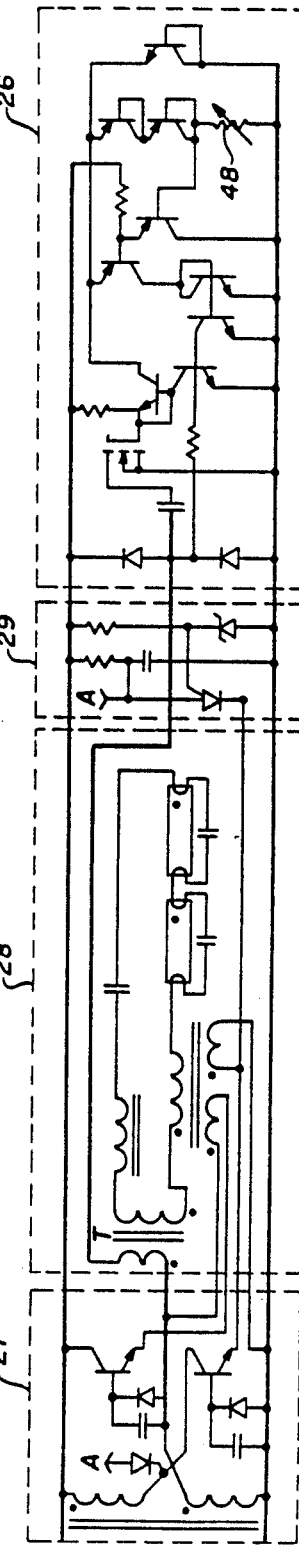
FIG. 6 is a schematic diagram of a discharge lamp driving apparatus according to a twelfth embodiment of the present invention.

Other embodiments of the control circuit are shown in FIGS. 5a and 5b. The most complex of these is shown in FIG. 6 at reference numeral 26. The circuit depicts an integradable divider and driver for an MOS switch. The circuit takes a reference value set on the variable resistor 48 and correlates to the supply voltage, such that if the supply voltage doubles, the current drawn is reduced to ½, thereby providing a programmable constant power, power source and convertor. The point of connection of the variable resistor 48 could also be used for remote programming or for closed loop feedback operation. The control circuit 26 may be used because the power control scheme has negligible effect on the operating frequency. In addition, regardless of the activity within the control circuit, the voltage and current through the load remains sinusoidal.

The schematic diagram illustrated in FIG. 6 is a more complex but more efficient discharge lamp driver. It is comprised of the vertical push-pull switching circuit 27 also shown in FIG. 3c. Circuit 28 is basically comprised of a dual resonant circuit combined by the means of a transformer used as a dual fluorescent driver. A start-up circuit 29 is also used and is similar to start-up circuit 24 shown in FIG. 1.

Resistor 34 and zener diode 35 form a voltage reference at the cathode of zener diode 35. Component 37 forms a trigger device called a PUT.

The anode 38 of trigger device 37 is connected to capacitor 39 which is charged through resistor 40 forming a time constant such that when the voltage to the anode of trigger device 26 is high enough to conduct, it will cause the PUT to fire and thus supply a pulse of energy to turn on transistor 41. Once the transistor is conducting, current will flow through the series resonant tank circuit comprised of inductor 20, capacitor 21, capacitor 23, transformer 25, and capacitors 42 and 43. Discharge lamp 22 is not yet ignited and therefore appears as an open circuit across capacitor 23. The cathodes of lamp 22 are in series with both ends of capacitor 23 and thus serve to complete the series circuit.

If the lamp should be removed or one of the cathodes be open circuited and therefore fail to complete the circuit, transformer 25 would conduct no current, thus preventing transistor 41 from being latched into the on-state. This mechanism then acts to prevent the circuit from starting in the case of an absent or faulty lamp or if during operation the lamp would be removed, operation will also cease. Therefore, the cathode elements of lamp 22 are necessary components for sustained operation.

The latching of transistor 41 to the on-state constitutes a step function applied to the series resonant circuit. The resulting transient will cause the volgage between inductor 20 and capacitor 21 to peak in the positive direction when the current in the series circuit reaches 0. At this point, current transformer 25 will no longer be able to sustain drive to transistor 41. Furthermore, the magnetizing current in current transformer 25 together with the imminent current reversal in the series resonant circuit will cause transistor 44 to be turned on while the emitter of transistor 41 becomes reversed biased and is thus shut off. Transistor 33 now becomes latched on by the drive transformer 25, which is designed to provide a drive current sufficient to maintain saturation by providing a base current proportional in this case to the emitter current of transistor 44. Once again, a step function has been applied to the series circuit now causing the resulting transient between inductor 20 and capacitor 21 to swing in the opposite direction. Each time the collector of transistor 44 approaches the negative rail, it maintains capacitor 39 discharged via diode 45. Thus entering no extraneous start pulses while the system is operating. The foregoing thus describes the first two cycles of established synchronized driving which will cause the series resonant circuit to be always operated at its natural resonant frequency and therefore operation will be at the maximum possible Q. Operating in this way, without some loss mechanism or loss component being present will cause the voltage of the transient between conductor 20 and capacitor 21 to be higher and higher on each subsequent half cycle. It is this Q application that permits the circuit to apply voltages far greater than the supply voltage to the load (in this case the discharge lamp 22), thus achieving the power sourcing characteristic of very high voltage when no power is being dissipated. Once the voltage between inductor 20 and capacitor 21, when divided between capacitors 21 and 23 and the combination of capacitors 42 and 43, leaves a potential across capacitor 23 sufficient to cause the lamp, 22, to conduct, lamp ignition will take place. The lamp ignition is further aided by the cathode current provided to capacitor 23 prior to ignition, thus lowering the necessary ignition potential. This is how the circuit accomplishes the rapid start sequence. If instant start mode is desired, capacitor 23 would be connected across the lamp as before but would be sized such that:

1. No such cathode current is allowed to enhance cathode emission or

2. In the case of instant start lamps, where auxiliary heat is not possible, capacitor 23 would simply connect across the lamp such that the interruption of the series current in the event of bulb removal would now be accomplished by the connectors generally required for use this type of lamp.

It can then be seen from the above how as the fundamental mode of operation, the power source supply accomplishes the fluorescent light ignition sequence.

Once lamp 22 begins to conduct current, its now resistive impedance is in parallel with capacitor 23, effectively changing the equivalent series resonant frequency. Since the driver transistors 41 and 44 are synchronized by transformer 25, the subsequent driving will maintain operation at the maximum Q. As the current in lamp 22 increases due to negative impedance characteristic, capacitor 23 is more and more bypassed thus further lowering the operating frequency, until when full conduction in the lamp is reached, the dominant frequency determining elements become inductor 20 and capacitor 21 and the resonant frequency is only slightly affected by the parallel combination of lamp 22 and capacitor 23 (which now appears predominantly resistive).

Were it not for diodes 46 and 47, the continued lowering of the lamp impedance would result in the raising of the circuit Q, thus current and therefore energy built up in the tank circuit would escalate uncontrollably.

The method by which diodes 46 and 47 limit the energy, is explained by describing the mechanism of energy uptake from the DC supply.

Referring back to the initial stages of operation, when transistor 41 was first turned on, the current path was through capacitors 42 and 43 and subsequently through transistor 41. If both capacitors 42 and 43 are of the same value, then half of the current will come via the power supply at diode 31, through capacitor 42, and the series circuit, flowing out transistor 41 and returning to the negative side of the DC power supply. The other portion of the series circuit and transistor current, comes by way of discharging capacitor 43. However, this portion of the current will flow through transistor 41 and into capacitor 43 by way of the positive rail. This later portion of the total current is being circulated while the former which flowed from and to the power supply constitutes a net power draw from the power supply equalled to that portion of the current times the power supply voltage. Similarly, on the next half cycle, that process is repeated through transistor 44 and capacitor 43 resulting in a power uptake. As the current in the resonant cycle increases on each subsequent half cycle, more energy is drawn from the power supply, proportional to the increased current in the tank circuit. Once the current through capacitors 42 and 43 are sufficient to cause a voltage high enough to cause diode 46 or 47 to conduct, net energy uptake will cease for that portion of the cycle. Therefore, while either diode is conducting, energy is being recirculated. This mechanism of recirculating energy once the tank current has reached the desired current level, is the mechanism by which the energy in the tank and subsequently the power to the load is controlled. This recirculating mechanism then prevents the uncontrollable increase in voltage or current which could damage the unit.

From the above description, it can be readily seen that the self-synchronising process always maintains resonance thus the total impedance of the reactive elements in the series circuit is cancelled. Therefore, from the point of view of the lamp, aside from the nonlinearities of the components used, there is no series impedance effectively limiting the current or voltage applied to the lamp. Since there is no effective series impedance, ballasting does not take place in the conventional sense, but the lamp is forced to dissipate all of the energy which is drawn from the power supply during each half cycle. Accordingly, the present driving apparatus provides the characteristics of a nearly ideal power source, namely, very high voltage at high impedance and very high current at short circuit.

I claim:

1. A power sourcing apparatus for driving a load to dissipate a predetermined amount of power, comprising:

resonant circuit means incorporating said load;

switching means connected between a negative and positive voltage source adapted to alternately connect said resonant circuit means thereto when a zero current state at said switching means is detected;

synchronizing means for detecting a zero current state at said switching means and for driving said switching means, said synchronizing means being connected to said switching means and said resonant means; and control circuit means for controlling the amount of charge to be absorbed from said positive and negative voltage source for transfer to said resonant circuit means thereby permitting said load to dissipate a predetermined amount of power.

2. A power sourcing apparatus as defined in claim 1 wherein said resonant circuit means is comprised of a reactive element connected in parallel with said load and in series with a series LC circuit.

3. A power sourcing apparatus as defined in claim 2 wherein said switching means comprises a first semiconductor switch connected between said series LC circuit and said positive voltage source and a second semi-conductor switch connected between said series LC circuit and said negative voltage source.

4. A power sourcing apparatus as defined in claim 3 wherein said synchronizing circuit comprises a transformer having a primary coil input connected in series with said load, a primary coil output connected to said control means, a first secondary coil input connected to a point between said switching means and said LC circuit, a first secondary coil output connected to said first semi-conductor switch, a second secondary coil input connected to said second semi-conductor switch and a second secondary coil output connected to said negative voltage source.

5. A power sourcing apparatus as defined in claim 4 wherein said control means comprises a first diode having an anode connected to said primary coil output of said transformer and a cathode connected to said positive voltage source, a first capacitor connected in parallel thereto, a second diode having an anode connected to said negative voltage source and a cathode connected to said primary coil output of said transformer and a second capacitor connected in paralel thereto.

6. A power sourcing apparatus as defined in claim 2 wherein said load comprises a discharge lamp having a pair of anodes and a pair of cathodes.

7. A power sourcing apparatus as defined in claim 6 wherein said reactive element comprises a capacitor connected in series with said cathodes of said discharge lamp.

8. A power sourcing apparatus as defined in claim 1 further comprising an AC to DC convertor connected to said switching means and an AC source via an EMI filter.

9. A power sourcing apparatus as defined in claim 3 wherein said first and second semi-conductor switches are comprised of bipolar transistors.

10. A power sourcing apparatus as defined in claim 3 wherein said first and second semi-conductor switches are comprised of Field Effect transistors.

11. A power sourcing apparatus as defined in claim 2 wherein said switching means comprises a vertical push-pull switching circuit.

12. A power sourcing apparatus as defined in claim 11 wherein said vertical push-pull switching circuit is comprised of a transformer connected between said positive and negative voltage source and connected to said resonant circuit means via cascade driven bipolar transistors connected between said positive and negative voltage source and said resonant circuit means.

13. A power sourcing apparatus as defined in claim 12 wherein said control means comprises an intergrated divider and driver connected between said positive and negative voltage sources.

14. A power sourcing apparatus as defined in claim 13 wherein said resonant circuit means comprises a transformer combined with said load and connected between said switching means and said control means via a startup circuit.

15. A method of driving a load to dissipate a predetermined amount of power, using a power sourcing apparatus having resonant circuit means incorporating said load, switching means connected between a negative and positive voltage source adapted to alternately connect said resonant circuit means thereto, synchronizing means for driving said switching means, said synchronizing means being connected to said switching means and said resonant circuit means; and control means for controlling the amount of energy drawn from said voltage source, comprising the steps of:

detecting a zero current state at said switching means by means of said synchronizing means;

actuating said switching means to drive said resonant circuit means between said negative and positive voltage source when said zero current state is detected;

actuating said control means when said resonant circuit means is connected to said positive voltage source to allow a predetermined amount of charge to be absorbed from said negative voltage source;

actuating said control means when said resonant circuit means is connected to said negative voltage source to allow a predetermined amount of charge to be absorbed from said positive voltage source; and allowing said charge to be transferred to said resonant circuit means thereby permitting said load to dissipate a predetermined amount of power.

16. A method as defined in claim 15 wherein said zero current state is detected at a point between said switching means and said resonant circuit means.

17. A method as defined in claim 16 wherein said switching means is actuated when a current reversal occurs at said point.

* * * * *